(12) United States Patent
Lee et al.

(10) Patent No.: US 7,745,075 B2
(45) Date of Patent: Jun. 29, 2010

(54) METHOD FOR FABRICATING COLOR FILTER SUBSTRATES

(75) Inventors: Shu-Chin Lee, Taichung County (TW); Kun-Yu Lin, Hsinchu (TW); Fu-Chuan Tsai, Taipei County (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 1108 days.

(21) Appl. No.: 11/279,900

(22) Filed: Apr. 17, 2006

(65) Prior Publication Data

US 2007/0212621 A1    Sep. 13, 2007

(30) Foreign Application Priority Data

Mar. 9, 2006   (TW) ............... 95107986 A

(51) Int. Cl.
*G02B 5/20* (2006.01)
(52) U.S. Cl. ............................................. 430/7
(58) Field of Classification Search ........... None
See application file for complete search history.

(56) References Cited

U.S. PATENT DOCUMENTS

| 4,725,524 | A | * | 2/1988 | Elzer et al. ............ 430/258 |
| 5,391,458 | A | * | 2/1995 | Conrad ................. 430/258 |
| 5,817,441 | A |   | 10/1998 | Iwata et al. |
| 5,948,577 | A |   | 9/1999 | Nakazawa et al. |
| 6,060,199 | A |   | 5/2000 | Nagata et al. |
| 6,914,263 | B2 |   | 7/2005 | Yi |
| 7,325,309 | B2 | * | 2/2008 | Strand et al. ........... 29/890.1 |
| 2003/0226638 | A1 | * | 12/2003 | Chen et al. ............ 156/230 |
| 2004/0038138 | A1 | * | 2/2004 | Kiguchi et al. ............ 430/7 |

FOREIGN PATENT DOCUMENTS

| JP | 56125829 | * | 10/1981 |
| TW | 594423 | | 6/2004 |
| TW | 200525192 | | 8/2005 |
| TW | 200604586 | | 2/2006 |

* cited by examiner

*Primary Examiner*—John A McPherson
*Assistant Examiner*—Anna L Verderame
(74) *Attorney, Agent, or Firm*—Winston Hsu

(57) ABSTRACT

A method for fabricating color filters includes: providing a substrate; forming a dry film having a top layer and a bottom layer on the substrate; performing a patterning process on the dry film to form a patterned dry film having a plurality of banks and openings, wherein each of the openings is located between two adjacent banks; disposing at least one color filter material in each of the openings; and removing the top layer of the dry film.

22 Claims, 21 Drawing Sheets

METHOD FOR FABRICATING COLOR FILTER SUBSTRATES

BACKGROUND OF THE INVENTION

1. Field of the Invention

The present invention relates to a method for fabricating color filter substrates.

2. Description of the Prior Art

Thin film transistor liquid crystal displays (TFT-LCDs) primarily utilize thin film transistors arranged in the form of a matrix, capacitors, and electronic devices such as conversion pads to drive liquid crystal pixels for producing vivid color pictures. Since TFT-LCDs have the advantage of portability, low power consumption, and low radiation, they have been widely used in various portable electronic products, such as notebook computers and personal digital assistants (PDAs). The TFT-LCDs are also gradually replacing the cathode ray tube (CRT) monitors used with conventional desktop computers.

In general, TFT-LCDs include a TFT substrate having a plurality of thin film transistors arranged in a matrix, pixel electrodes, a plurality of scan lines or data lines arranged orthogonally, a color filter substrate having a plurality of color filters arranged in a matrix, and a liquid crystal layer disposed between the TFT substrate and the color filter substrate. Preferably, a plurality of deposition and photo-etching-processes (PEP) are performed to fabricate the thin film transistors on the surface of the TFT substrate, and a plurality of photolithography processes are performed to form the color filters on the color filter substrate, thereby providing the vivid color for each pixel of the TFT-LCD.

Please refer to FIG. 1 to FIG. 6. FIG. 1 to FIG. 6 are perspective diagrams showing the means of fabricating a color filter substrate according to the prior art. As shown in FIG. 1, a substrate 12, such as a glass substrate is first provided. An inorganic film 14 composed of chromium and a light sensitive film 16 composed of polyimide are disposed on the surface of the substrate 12 thereafter. Next, as shown in FIG. 2, a patterning process is performed by utilizing a mask to perform an exposure and development process on the light sensitive film 16 to define a plurality of banks 18 and openings 20.

As shown in FIG. 3, an etching process is performed on the inorganic film 14 to remove the region not covered by the patterned light sensitive film 16 and further form the plurality of banks 18 and the openings 20 by utilizing the light sensitive film 16 as a hardmask. A surface treatment is performed thereafter on the surface of the substrate 12, the openings 20, and the banks 18. Since a higher chemical affinity is found between the banks 18 and the color filter formed afterwards, the banks 18 will exhibit a hydrophobic characteristic. The surface of the substrate 12 within openings 20 on the other hand, exhibits a hydrophilic characteristic as a lower chemical affinity is measured between the substrate 12 and the color filter.

As shown in FIG. 4, an ink jet process is performed to utilize a print head 22 to dispose a color filter material 24 into each of the openings 20, in which the color filter material 24 includes red ink, green ink, and blue ink. Next, as shown in FIG. 5, a coating process is performed to form a passivation layer 26 on the color filter material 24 and the banks 18 and to planarize the surface of the substrate 12. Subsequently, as shown in FIG. 6, a transparent conductive layer 28 composed of indium tin oxide (ITO) or indium zinc oxide (IZO) is formed on the passivation layer 26 to complete the process of fabricating a color filter substrate.

However, due to strong variation between the chemical affinity of the materials, the color filter material disposed on the surface of the substrate 12 often produce an uneven surface or poor overall shape. In order to solve this problem, the conventional technique generally disposes a passivation layer over the surface of the color filter material to planarize the surface of the color filter material, such as the structure shown in FIG. 5. However, despite the fact that the structure may reduce the problem of uneven color filter surface, other side effects such as poor light transmittance and light usage will result.

SUMMARY OF THE INVENTION

It is therefore an objective of the present invention to provide a method of fabricating color filter substrates to resolve the above-mentioned problems, including poor light transmittance and light usage.

According to the present invention, a method for fabricating color filters includes: providing a substrate; forming a dry film having a top layer and a bottom layer on the substrate; performing a patterning process on the dry film to form a patterned dry film having a plurality of banks and openings, wherein each of the openings is located between two adjacent banks; disposing at least one color filter material in each of the openings; and removing the top layer of the dry film.

By forming a dry film having a top layer and a bottom layer over the surface of a substrate, performing a patterning process to define a plurality of banks and openings, and removing the top layer of the dry film after disposing a color filter material in each opening, the present invention is able to effectively improve the problem of poor light transmittance and light usage caused by directly performing a planarizing process on the inorganic film and the light sensitive film, as is commonly utilized in the conventional technique.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
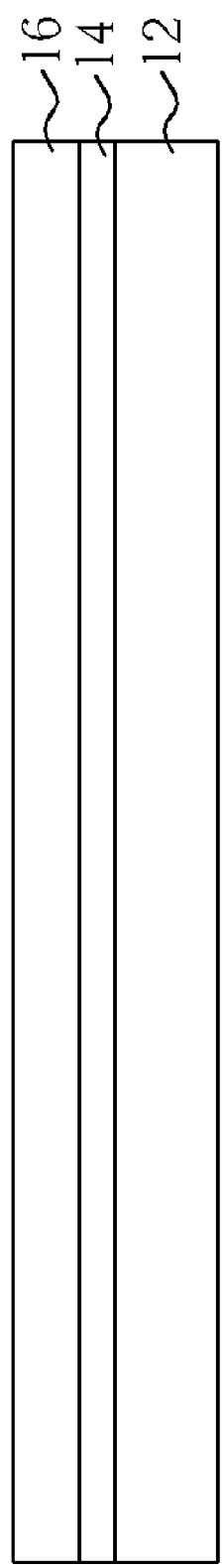
FIG. 1 to FIG. 6 are perspective diagrams showing the means of fabricating a color filter substrate according to the prior art.
Figure 2:
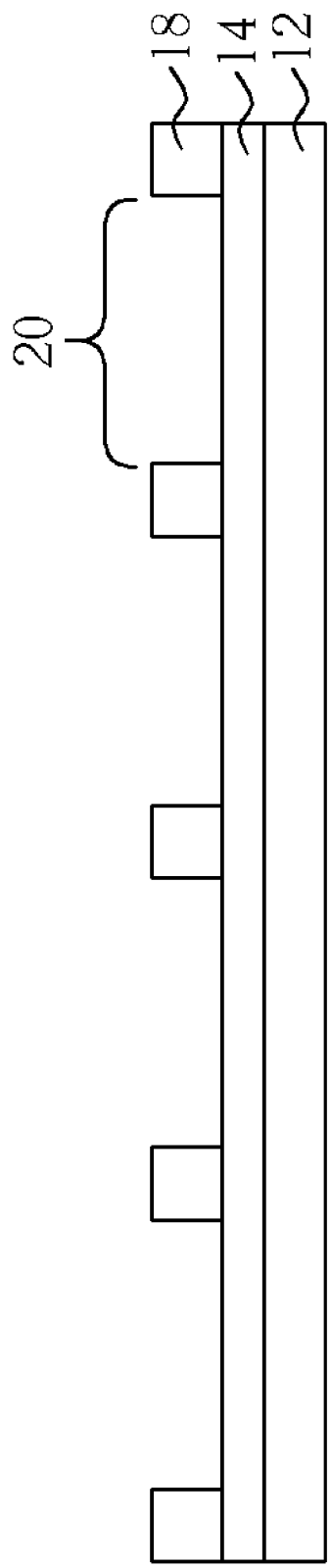
Figure 3:
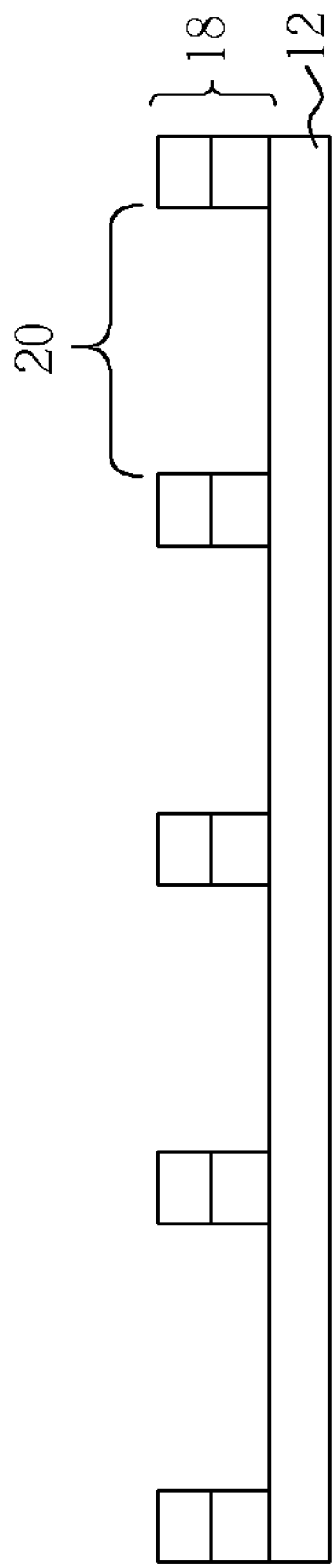
Figure 4:
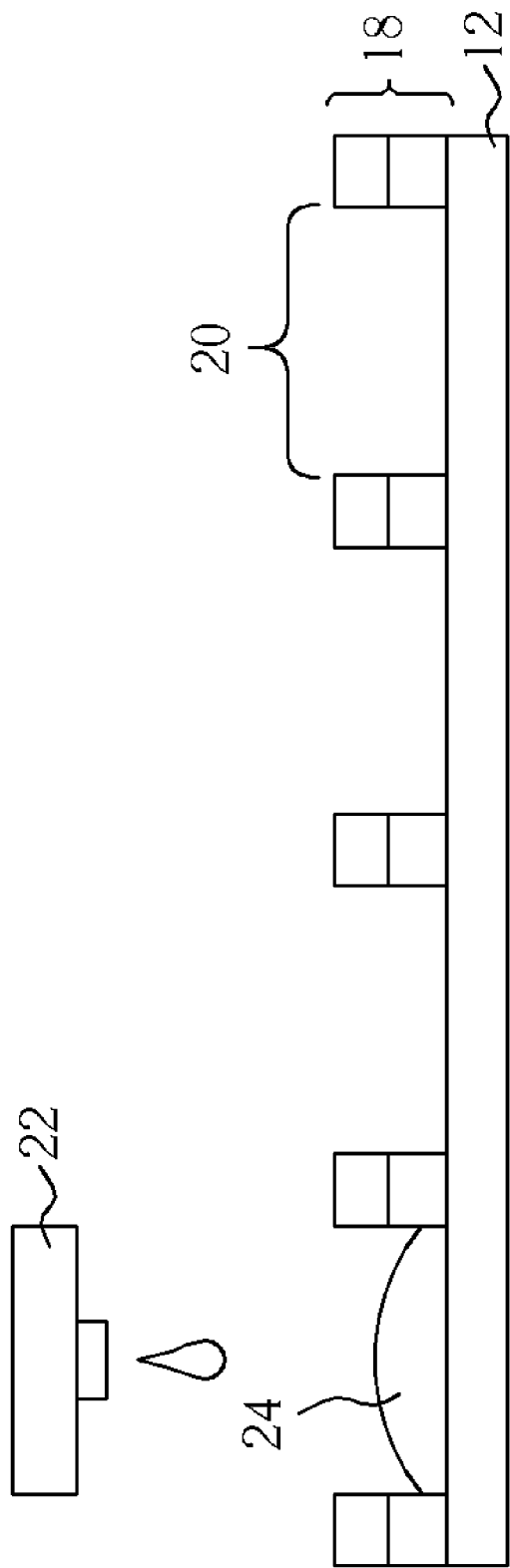
Figure 5:
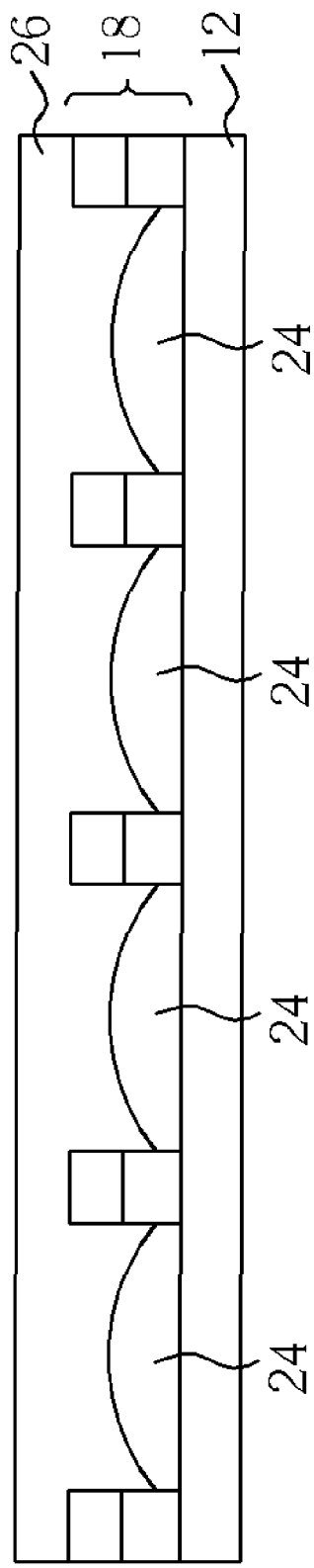
Figure 6:
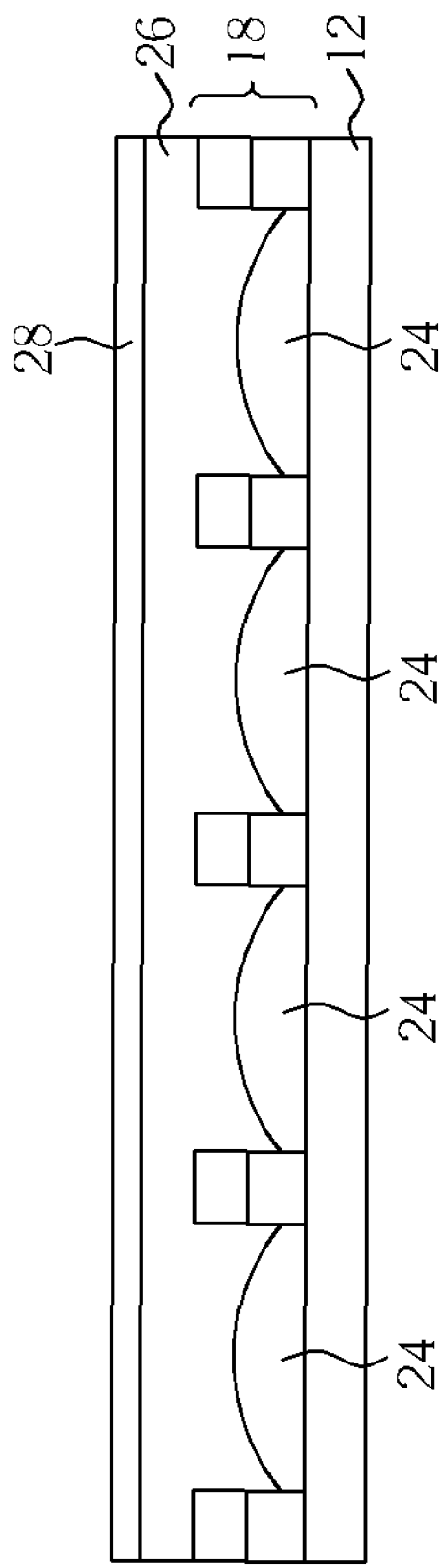
Figure 7:
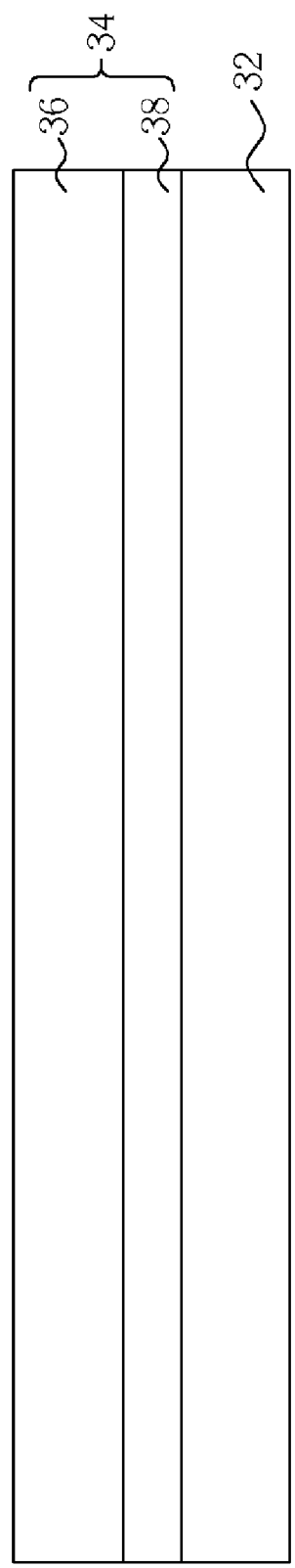
FIG. 7 to FIG. 14 are perspective diagrams showing the means of fabricating a color filter substrate according to the preferred embodiment of the present invention.

Please refer to FIG. 7 to FIG. 14. FIG. 7 to FIG. 14 are perspective diagrams showing the means of fabricating a color filter substrate according to the preferred embodiment of the present invention. As shown in FIG. 7, a substrate 32, such as a transparent glass substrate is first provided. A lamination roller process is performed thereafter to form a dry film 34 having a top layer 36 and a bottom layer 38 over one surface of the substrate 32, in which the thickness of the dry film 34 is approximately between 2 μm to 6 μm. Preferably, the dry film 34 can be composed of an organic material or a light sensitive photoresist.

Figure 8:
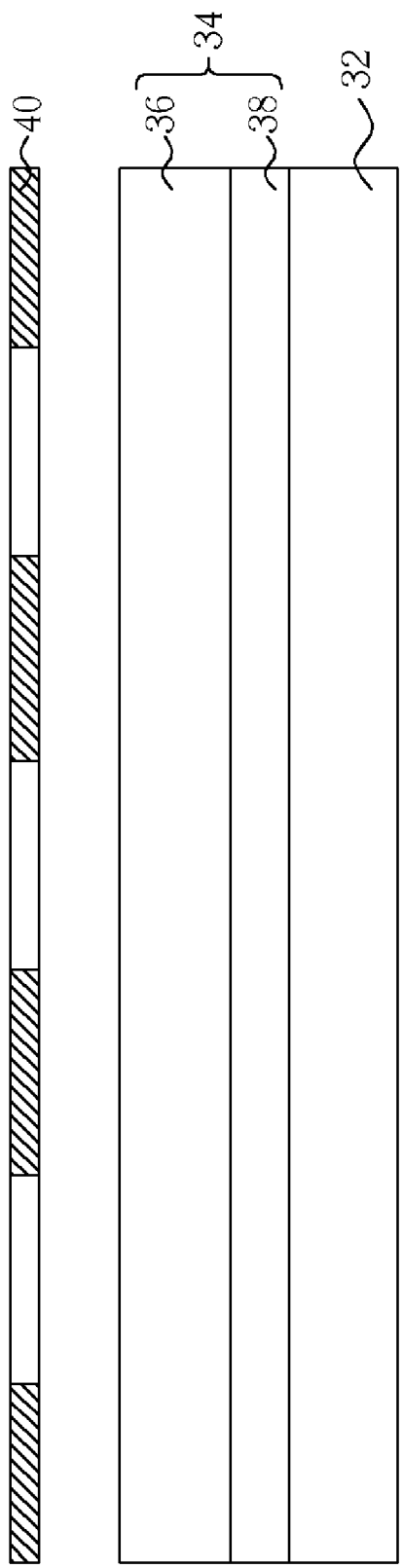
Figure 9:
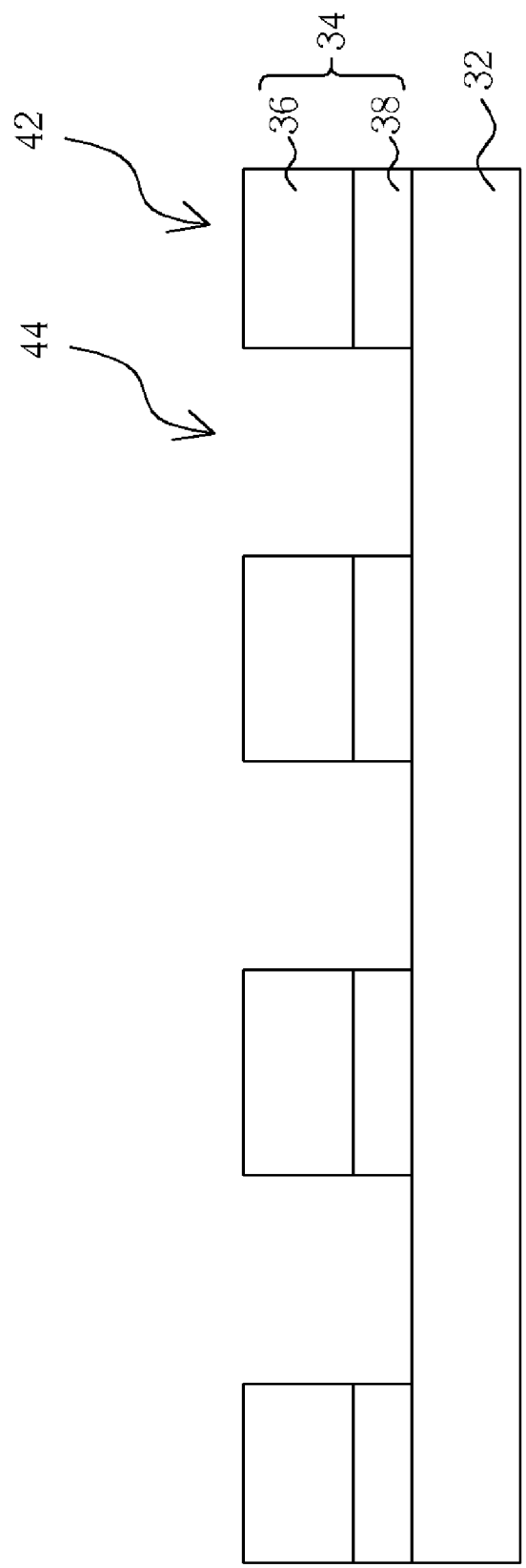

As shown in FIG. 8, a patterning process is performed on the dry film 34, such as first providing a patterned mask 40 above the dry film 34. Next, an exposure and development process is performed to utilize the patterned mask 40 to form a plurality of banks 42 and a plurality of openings 44 in the dry film 34, as shown in FIG. 9. Preferably, each of the openings 44 will form a pixel region of a display panel, in which the area of the pixel region is between about $2\times10^5$ μm² to about $7\times10^5$ μm².

Alternatively, the patterning process is performed to first form a patterned mask (not shown) above the dry film 34. Next, an etching process is performed on the dry film 34 by utilizing the patterned mask (not shown) as a hardmask to form a plurality of banks 42 and a plurality of openings 44 in the dry film 34. The patterned mask is removed thereafter.

Figure 10:
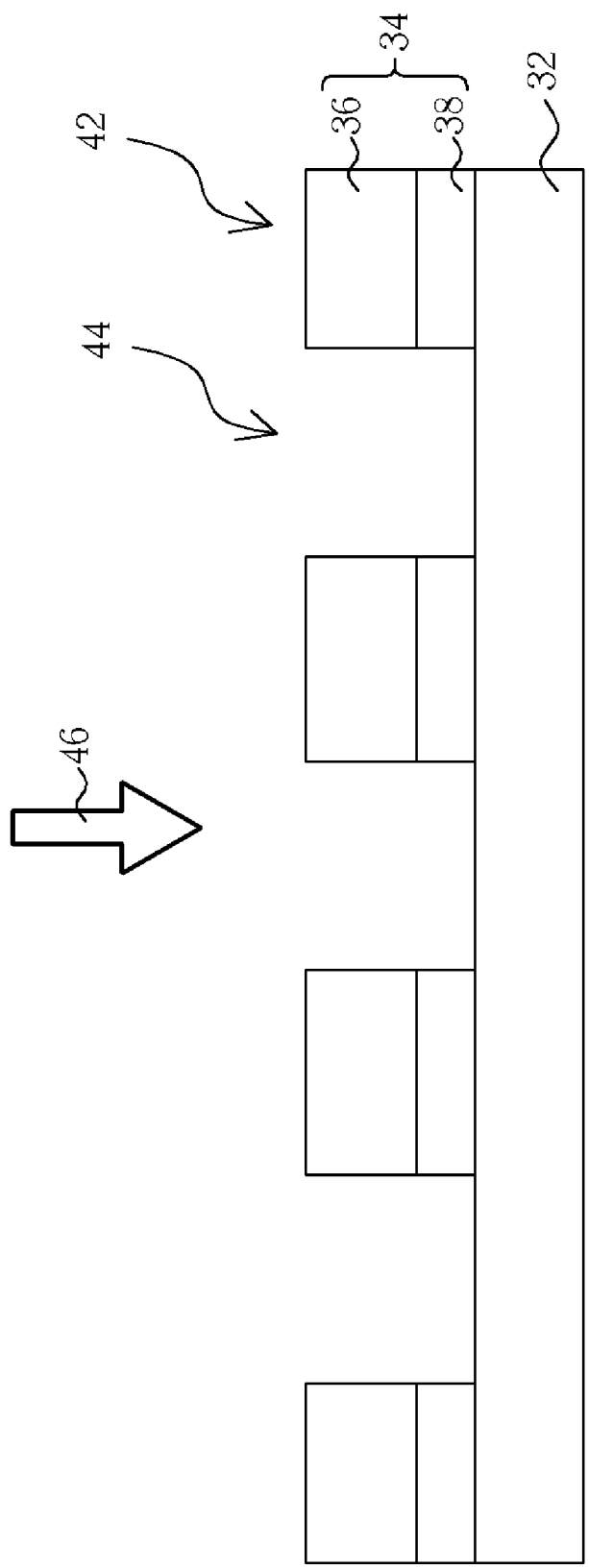

As shown in FIG. 10, a surface treatment 46, such as a plasma treatment, is performed on the patterned dry film 34 after the formation of the banks 42 and the openings 44. The plasma treatment includes applying a mixture containing oxygen ($O_2$) and carbon fluoride ($CF_4$). Preferably, the surface treatment is performed to treat the top layer 36 of the dry film into hydrophile and treat the bottom layer 38 into hydrophobia, or to treat the top layer 36 into hydrophile and treat the bottom layer 38 into hydrophobia.

Figure 11:
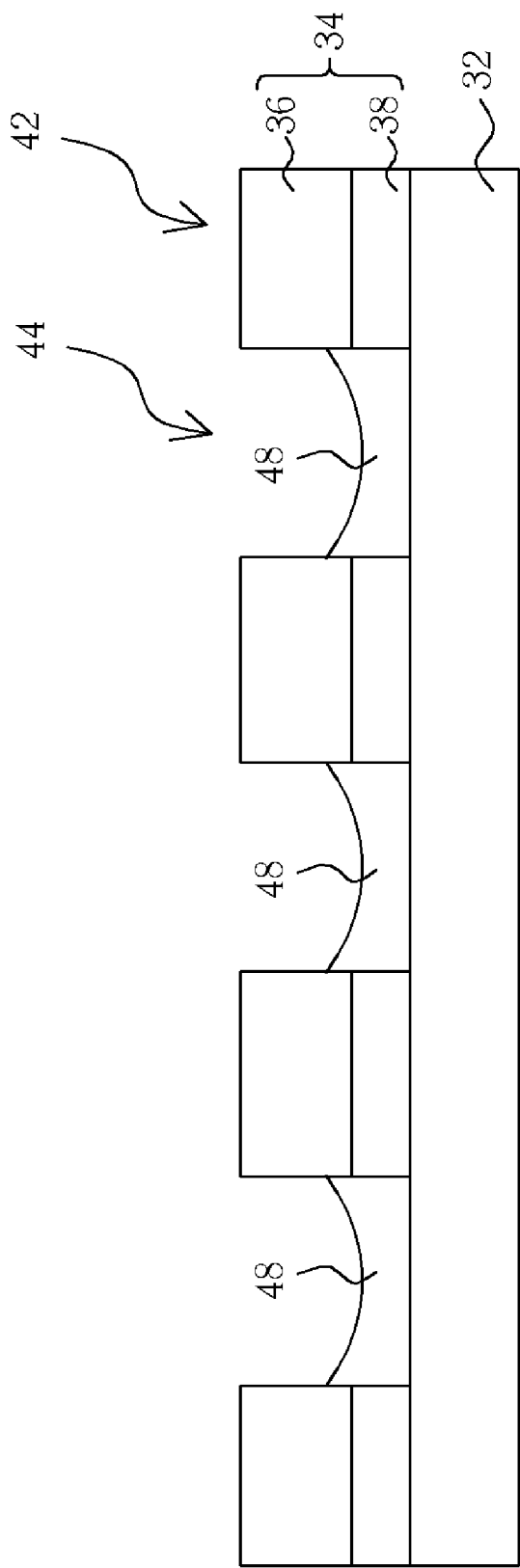

As shown in FIG. 11, an ink jet process is performed to dispose at least a color filter material 48 in each opening 44. The color filter material 48 may include red ink, blue ink, or green ink according to the demand of different products.

Figure 12:
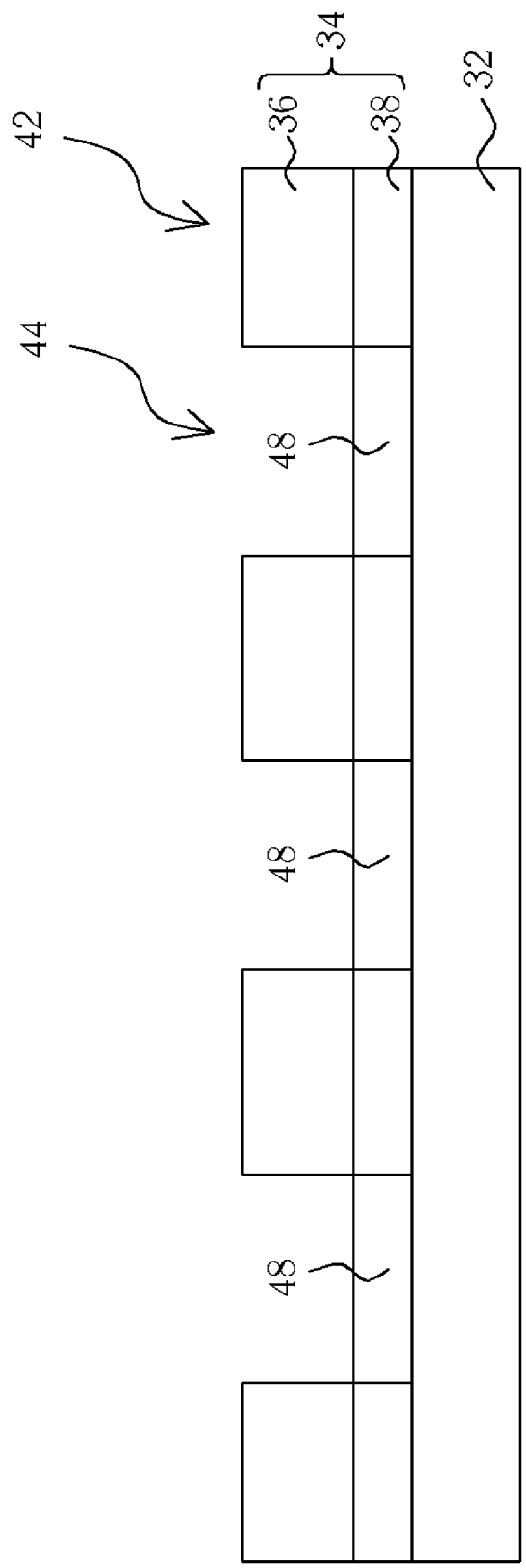
Figure 13:
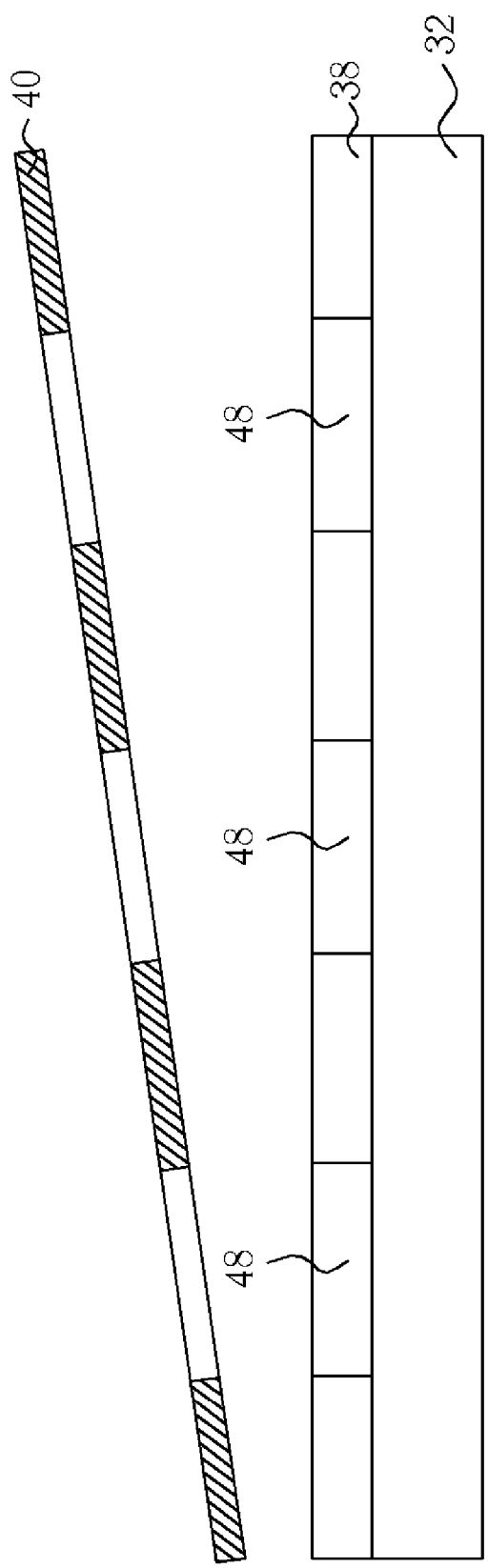

As shown in FIG. 12, a curing process, such as an ultraviolet curing process is performed on the dry film 34. By utilizing the curing process, the present invention is able to effectively control the shape of the red, green, and blue color filters, thereby increasing the optical property and uniformity of the color filter. Next, as shown in FIG. 13, a development process or a stripping process utilizing a roller is performed to remove the top layer 36 of the dry film 34.

Figure 14:
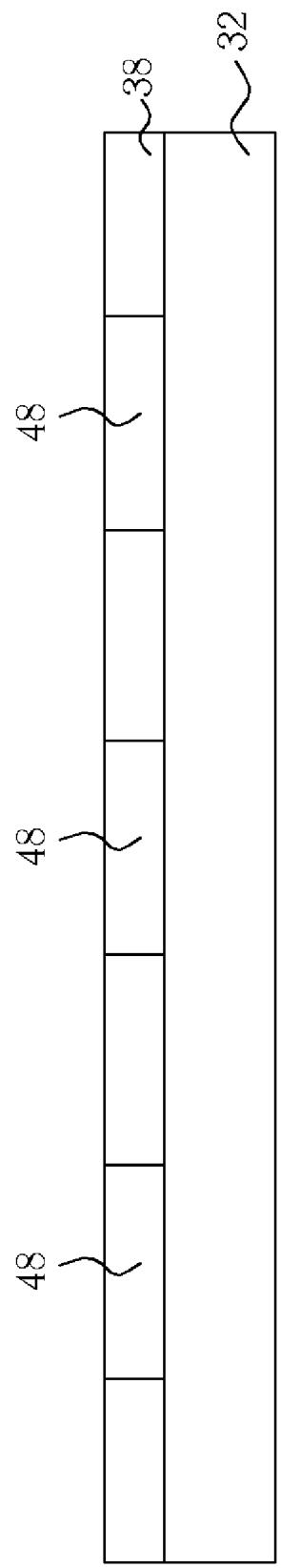

After the removal of the top layer 36, as shown in FIG. 14, a baking process is performed by placing the substrate 32 in an oven, in which the temperature of the baking process is from about 200° C. to about 250° C. and the duration of the baking process is approximately 30 minutes to 60 minutes. Preferably, the baking process is able to effectively increase the durability and mechanical strength of the product, and complete the color filter substrate of the present invention.

By forming a dry film having a top layer and a bottom layer over the surface of a substrate, performing a patterning process to define a plurality of banks and openings, and removing the top layer of the dry film after disposing a color filter material in each opening, the present invention is able to effectively improve the problem of poor light transmittance and light usage caused by directly performing a planarizing process on the inorganic film and the light sensitive film, as is commonly utilized in the conventional technique.

Figure 15:
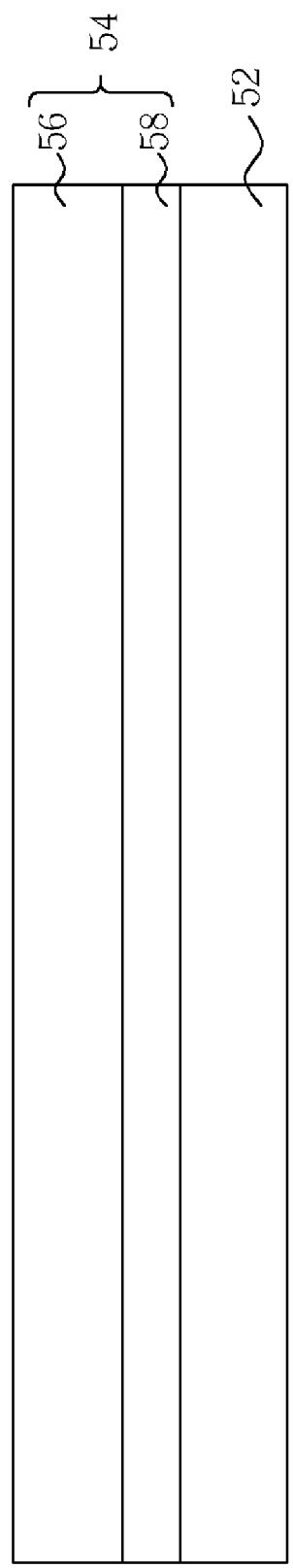
FIG. 15 to FIG. 21 are perspective diagrams showing the means of fabricating a color filter substrate according to another embodiment of the present invention.

Please refer to FIG. 15 to FIG. 21. FIG. 15 to FIG. 21 are perspective diagrams showing the means of fabricating a color filter substrate according to another embodiment of the present invention. As shown in FIG. 15, a substrate 52, such as a glass substrate is provided. A lamination roller process is performed thereafter to form a dry film 54 over one surface of the substrate 52, in which the thickness of the dry film 54 is approximately between 2 μm to 6 μm. Preferably, the dry film 54 includes a hydrophilic layer 56 and a hydrophobic layer 58, in which the hydrophilic layer 56 is disposed on the hydrophobic layer 56, as shown in FIG. 15. Alternatively, the placement of the hydrophilic layer and the hydrophobic layer can be reversed, such that the hydrophobic layer is disposed above the hydrophilic layer. In contrast to the previous embodiment, the present embodiment directly forms a dry film having a hydrophilic layer and a hydrophobic layer on the surface of a substrate, thereby eliminating the need of performing a surface treatment process on the patterned dry film after the formation of the banks and the openings.

Figure 16:
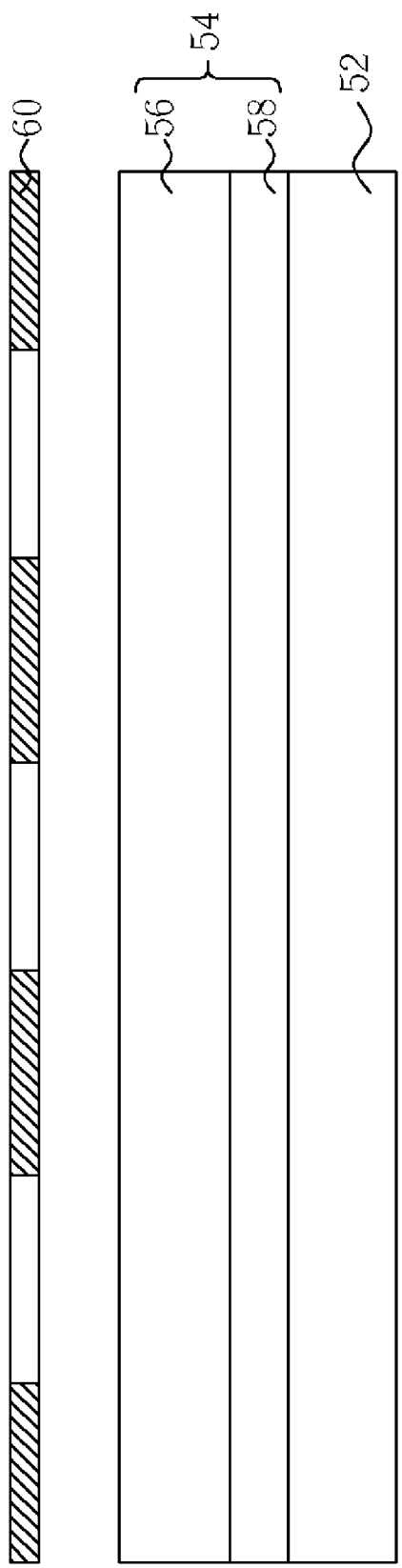
Figure 17:
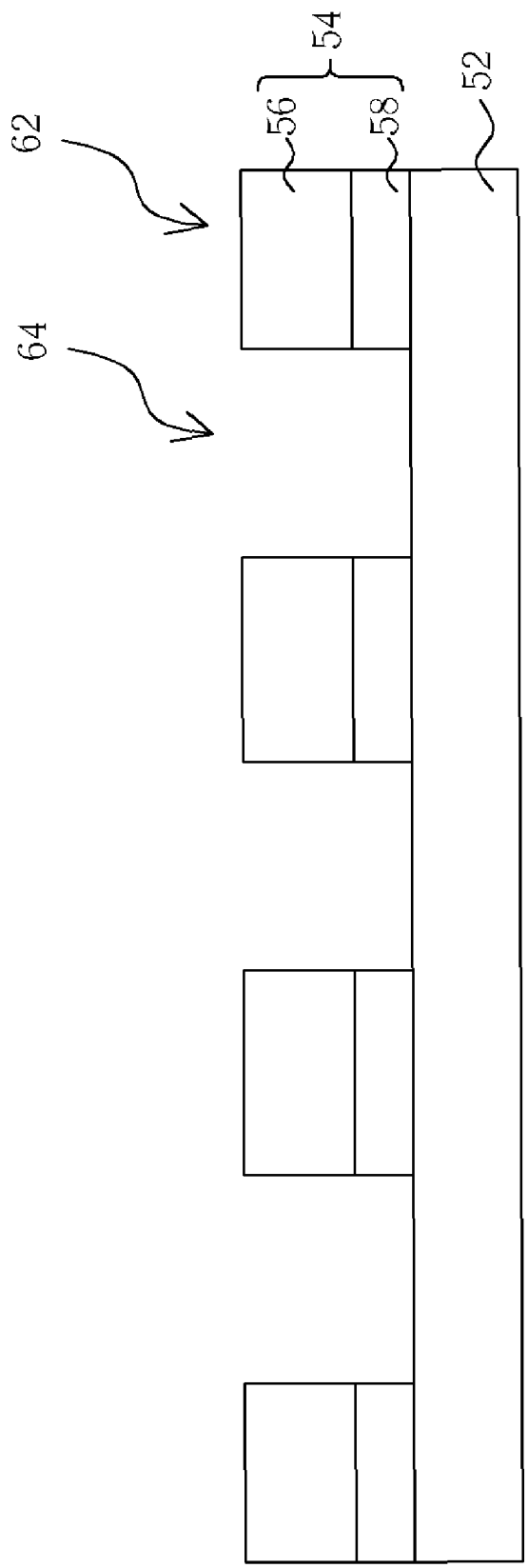

As shown in FIG. 16, a patterning process is performed on the dry film 54, such as first providing a patterned mask 60 above the dry film 54. The patterned mask 60 can be a photomask, for example. Next, an exposure and development process is performed to utilize the patterned mask 60 to form a plurality of banks 62 and a plurality of openings 64 in the dry film 54, as shown in FIG. 17. Preferably, each of the openings 64 will form a pixel region of a display panel, in which the area of the pixel region is between about $2\times10^5$ μm² to about $7\times10^5$ μm².

Alternatively, the patterning process is performed to first form a patterned mask (not shown) above the dry film 54. Next, an etching process is performed on the dry film 54 by utilizing the patterned mask (not shown) as a hardmask to form a plurality of banks 62 and a plurality of openings 64 in the dry film 54. The patterned mask is removed thereafter.

Figure 18:
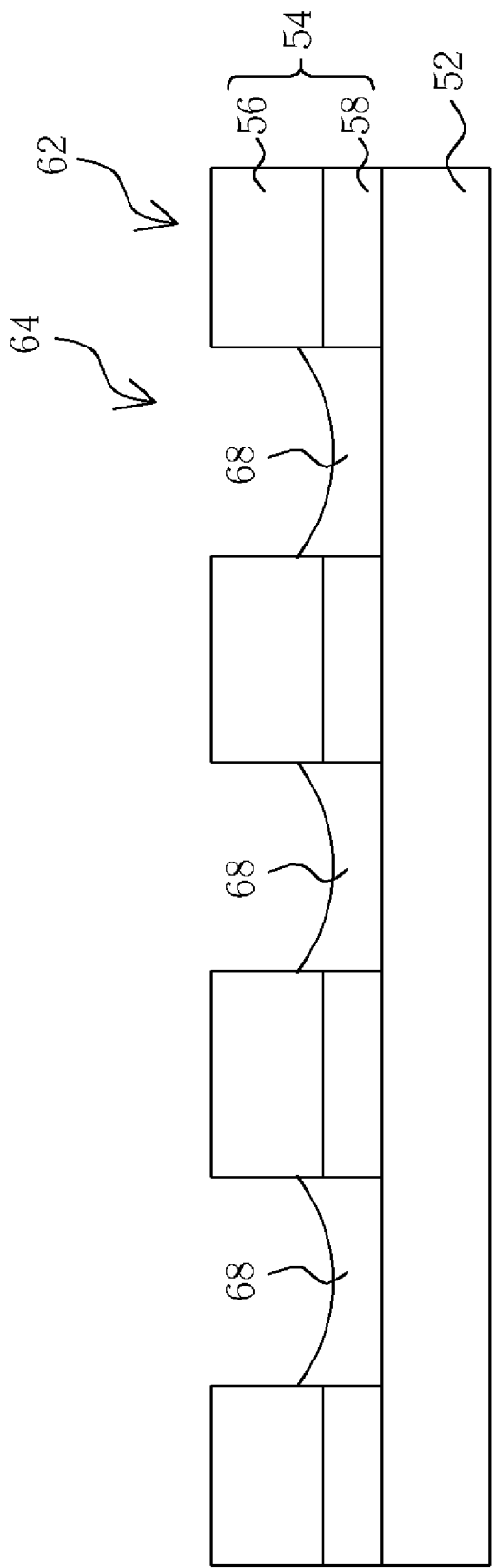

After the formation of the banks 62 and the openings 64, as shown in FIG. 18, an ink jet process is performed to dispose at least a color filter material 68 in each of the openings 64. The color filter material 68 may include red ink, blue ink, or green ink according to the demand of the products.

Figure 19:
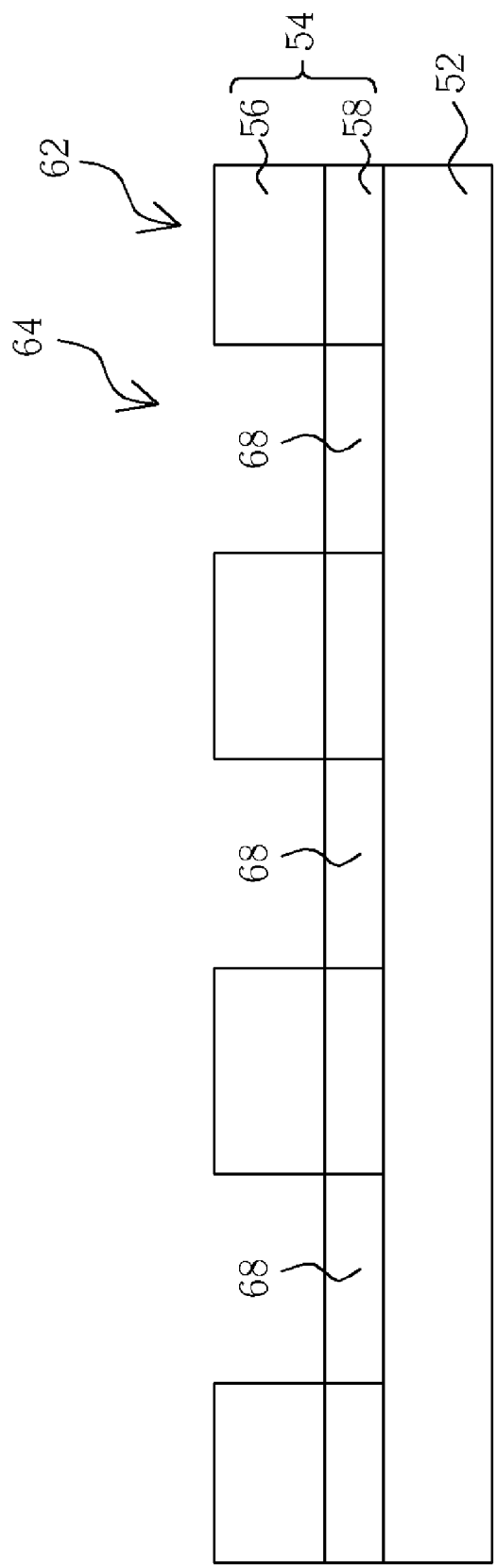

As shown in FIG. 19, a curing process, such as an ultraviolet curing process is performed on the dry film 54. By utilizing the curing process, the present invention is able to effectively control the shape of the red, green, and blue color filters, thereby increasing the optical property and uniformity of the color filter substrate.

Figure 20:
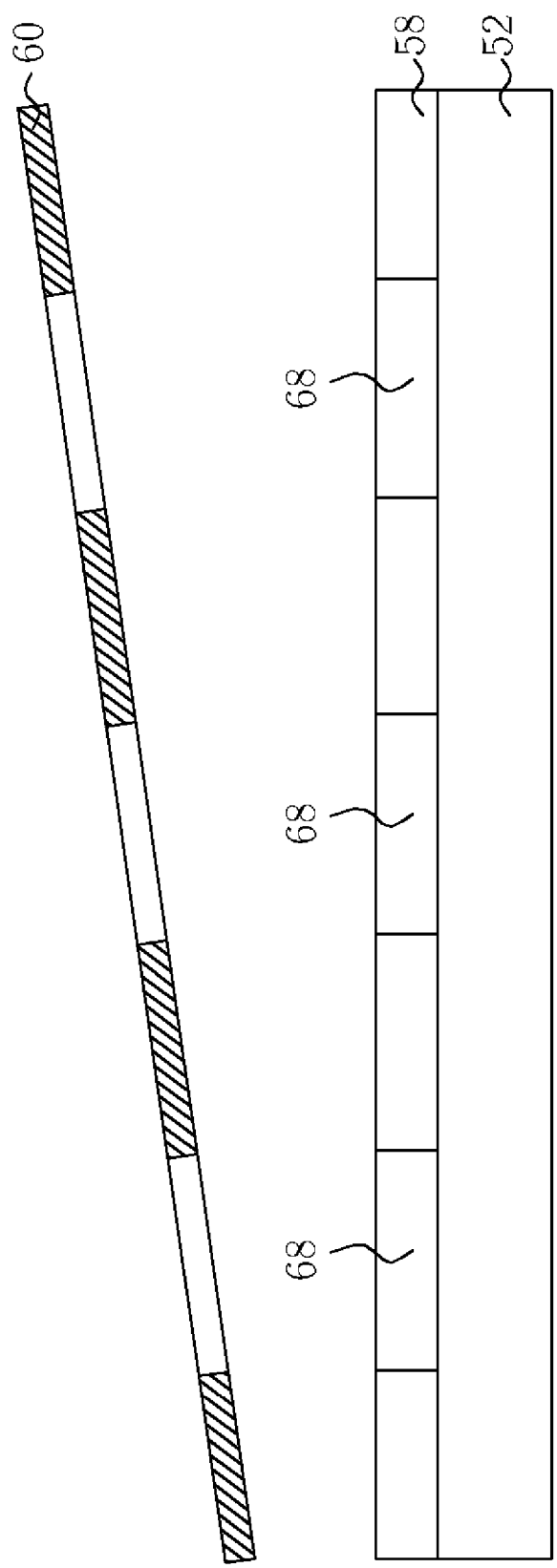

After the color filter materials are cured, as shown in FIG. 20, a development process utilizing the mask 60 or a stripping process utilizing a roller is performed to remove the hydrophilic layer 56 of the dry film 54.

Figure 21:
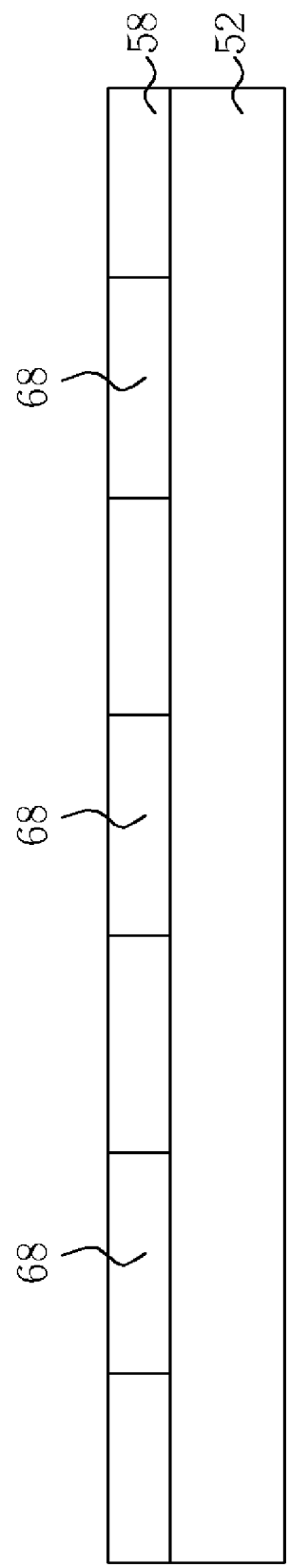

After the removal of the hydrophilic layer 56, as shown in FIG. 21, a baking process is performed by placing the substrate 52 in an oven, in which the temperature of the baking process is from about 200° C. to about 250° C. and the duration of the baking process is approximately 30 minutes to 60 minutes. Preferably, the baking process is able to effectively increase the durability and mechanical strength of the product, and complete the color filter substrate of the present invention.

In contrast to the conventional method of fabricating color filter substrates, the present invention first forms a dry film having a top layer and a bottom layer over the surface of a substrate, performs a patterning process to form a plurality of banks and openings within the dry film, and removes the top layer of the dry film after disposing at least a color filter material in each of the openings. Additionally, the present invention is also able to directly form a dry film having a hydrophilic layer and a hydrophobic layer over the surface of a substrate, and perform a patterning process on the dry film to form a plurality of banks and openings within the dry film, thereby eliminating the need of performing a surface treatment process on the dry film. Ultimately, the present invention is able to simplify the process of fabricating color filter substrates, provide a color filter substrate with improved optical property, and improve problems of poor light transmittance and light usage caused by directly performing a planarizing process on the inorganic film and the light sensitive film, as commonly utilized in the conventional technique.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for fabricating a color filter substrate, comprising:
   providing a substrate;
   forming a dry film having a top layer and a bottom layer on the substrate;
   performing a patterning process on the top layer and the bottom layer of the dry film to form a patterned dry film having a plurality of banks and openings, wherein each of the openings is located between two adjacent banks;
   disposing at least one color filter material in each of the openings; and
   removing the top layer of the dry film.

2. The method of claim 1, wherein the top layer is hydrophilic and the bottom layer is hydrophobic.

3. The method of claim 1, wherein the top layer is hydrophobic and the bottom layer is hydrophilic.

4. The method of claim 1, wherein the color filter material comprises red ink, green ink, or blue ink.

5. The method of claim 1, wherein the patterning process comprises:
   providing a mask above the dry film; and
   utilizing the mask to perform an exposure and development process for forming the plurality of banks and openings.

6. The method of claim 1, wherein the patterning process comprises:
   forming a patterned mask on the dry film;
   performing an etching process to form the plurality of banks and openings; and
   removing the patterned mask.

7. The method of claim 1, further comprising performing a surface treatment on the patterned dry film after the formation of the banks and the openings.

8. The method of claim 7, wherein the surface treatment comprises applying a surface treatment which causes the surface of the top layer into hydrophile and the surface of the bottom layer into hydrophobia before removing the top layer of the dry film and before disposing the color filter material in each of the openings.

9. The method of claim 7, wherein the surface treatment comprises applying a surface treatment which causes the surface of the top layer into hydrophobia and the surface of the bottom layer into hydrophile before removing the top layer of the dry film and before disposing the color filter material in each of the openings.

10. The method of claim 7, wherein the surface treatment comprises a plasma treatment.

11. The method of claim 10, wherein the plasma treatment comprises applying a mixture of oxygen ($O_2$) and carbon fluoride ($CF_4$).

12. The method of claim 1, further comprising performing a curing process on the patterned dry film after disposing the color filter material into the openings.

13. The method of claim 12, wherein the curing process comprises an ultraviolet curing process.

14. The method of claim 1, further comprising performing a baking process on the bottom layer of the patterned dry film after removing the top layer.

15. The method of claim 14, wherein the temperature of the baking process is from about 200° C. to about 250° C.

16. The method of claim 14, wherein the duration of the baking process is from about 30 minutes to about 60 minutes.

17. The method of claim 1, wherein the removal of the top layer comprises performing a development process or a stripping process.

18. The method of claim 17, wherein the stripping process is achieved by a roller.

19. The method of claim 1, wherein the thickness of the thy film is between about 2 μm to about 6 μm.

20. The method of claim 1, wherein each of the openings forms a pixel region of a display panel, and the area of the pixel region is between about $2\times10^5$ μm$^2$ to about $7\times10^5$ μm$^2$.

21. The method of claim 1, wherein forming the dry film over the surface of the substrate comprises performing a lamination roller process.

22. The method of claim 1, wherein disposing the color filter material in the openings comprises performing an ink jet process.

* * * * *